United States Patent [19]

Schultheis et al.

[11] 4,140,390
[45] Feb. 20, 1979

[54] PUNCH ALARM SYSTEM FOR PHOTOPRINTING MACHINES

[75] Inventors: Andreas C. Schultheis, Silver Spring, Md.; Charles S. Lerch, Jr., McLean; Raymond L. Harris, Alexandria, both of Va.

[73] Assignee: System Planning Corporation, Arlington, Va.

[21] Appl. No.: 824,129

[22] Filed: Aug. 12, 1977

[51] Int. Cl.² .............................................. G03B 29/00
[52] U.S. Cl. ......................................... 355/29; 83/61
[58] Field of Search ............... 355/29, 28, 40, 41, 355/112, 13; 83/360, 364, 365, 367, 370, 371, 210, 209, 61, 62, 63; 250/559, 571, 572

[56] References Cited

U.S. PATENT DOCUMENTS 3,807,855  4/1974  Zajac ........................................ 355/29
3,948,125  4/1976  Hujer et al. ........................ 83/364 X Primary Examiner—L. T. Hix
Assistant Examiner—W. J. Brady
Attorney, Agent, or Firm—Pollock, Vande Sande and Priddy

[57] ABSTRACT

Sensors are added to a conventional photoprinting machine, adjacent the edges of the photographic print paper and downstream of the marking system in the machine, for monitoring the presence and absence of cut marks and sort marks in or on the strip of photographic print paper. The sensors are coupled to a logical circuit and associated control circuits which provide the operator of the photoprinting machine with an indication of the operability of the marking system in said machine.

20 Claims, 4 Drawing Figures

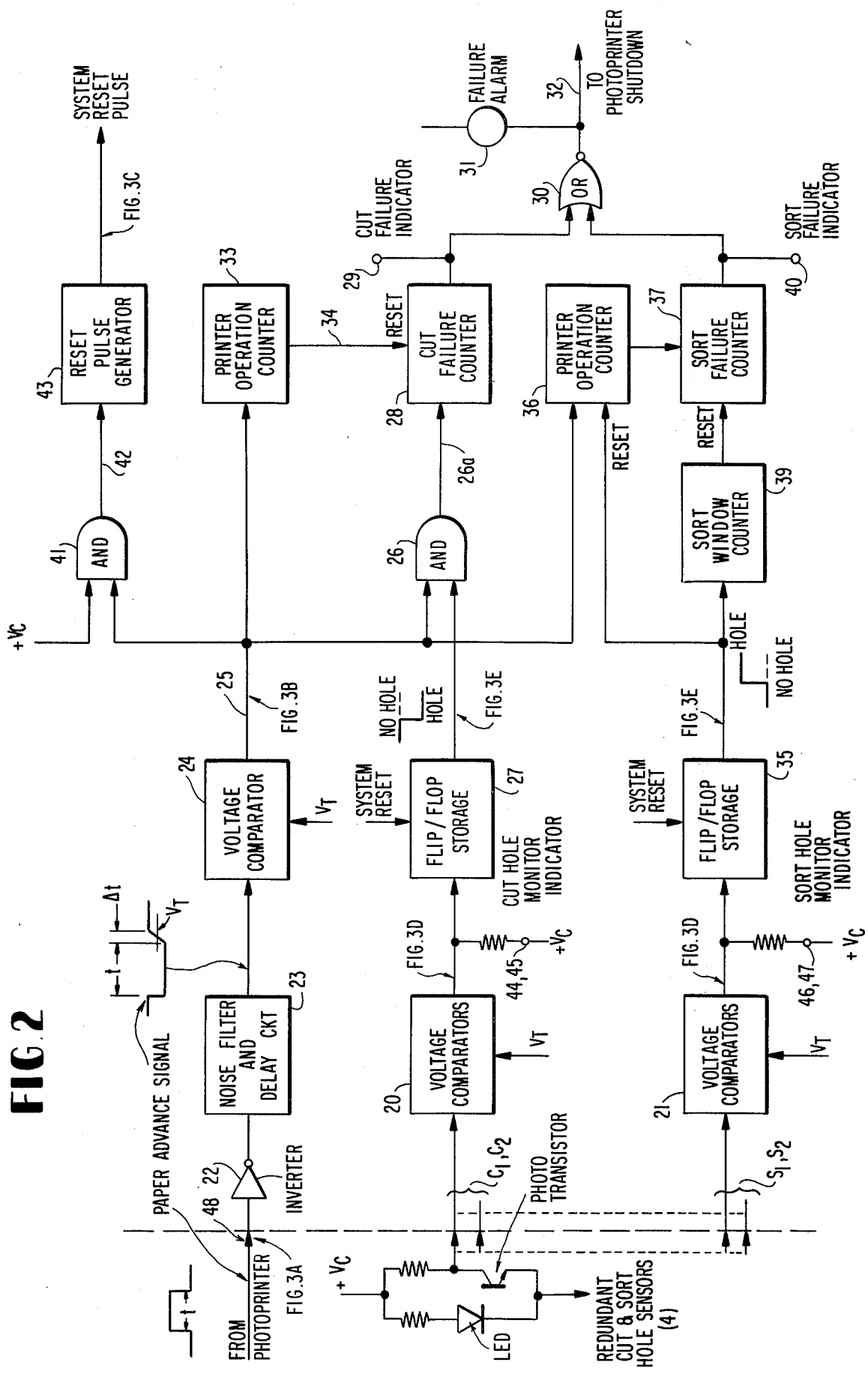

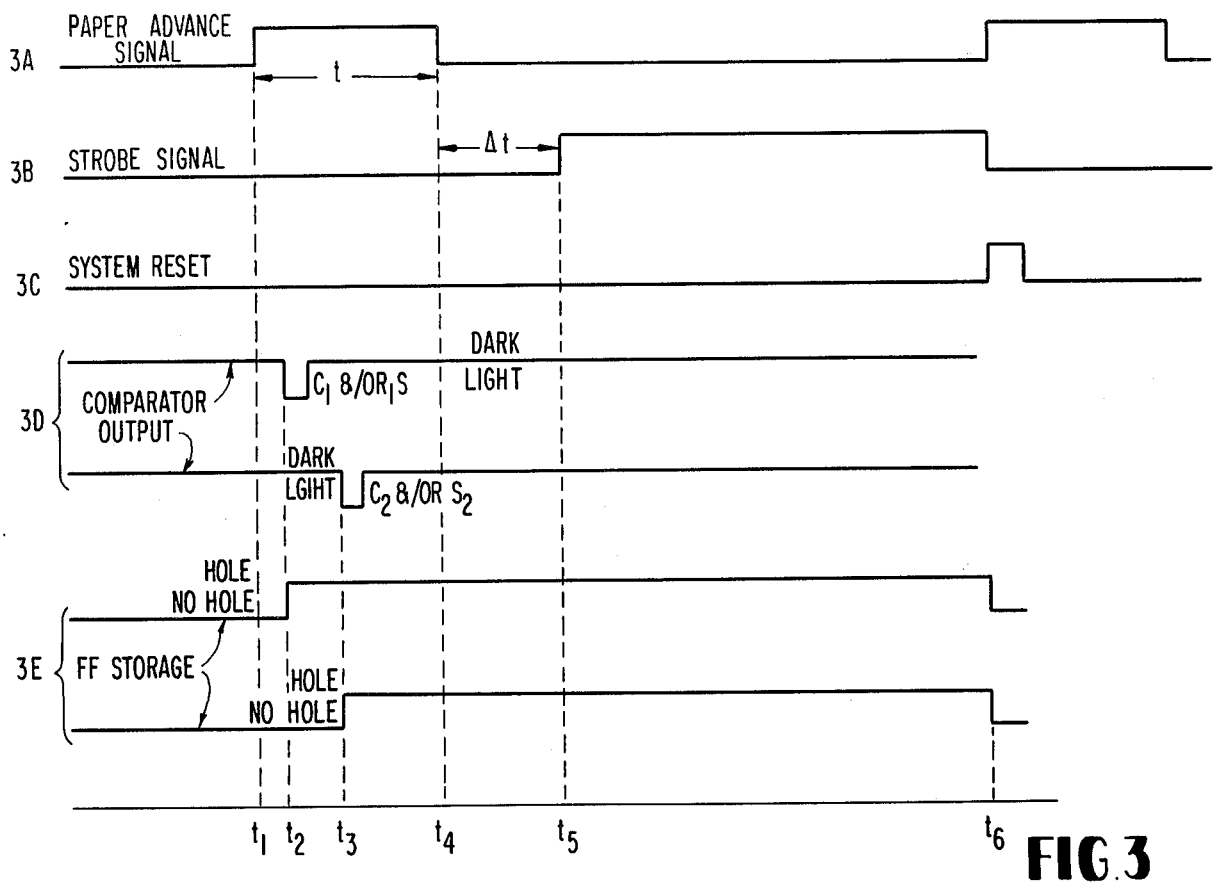
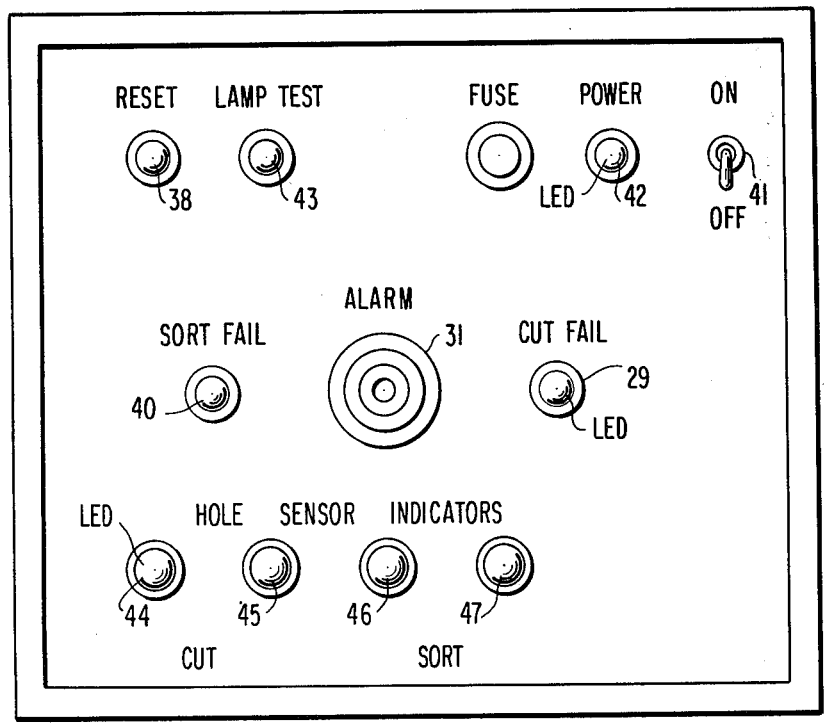

PUNCH ALARM SYSTEM FOR PHOTOPRINTING MACHINES

BACKGROUND OF THE INVENTION

High speed automatic printing machines used in commercial photoprocessing operations (e.g., machines of the type sold by Eastman Kodak Company under their designation Kodak 2610) print contiguous pictures or print frames on an elongated strip of photographic print paper contained within the machine. Typically, the machine includes means for advancing elongated, spliced-together strips of film negatives through the machine, and also includes means for advancing an elongated strip of photographic print paper through the machine in a step-by-step operation in response to successive paper advance signals generated by the machine, thereby to effect an exposure of successive ones of said negatives onto the photosensitive side of successive portions of the strip of print paper. The photoprinting machine typically includes, moreover, a marking system therein responsive to each of the paper advance signals for placing an identifiable cut mark on the strip of print paper between each pair of adjacent print frames, for later use in cutting individual photographic prints from the elongated strip of photographic print paper following photographic development of the print paper. The photoprinting machine also typically includes means responsive to detection of a splice in said spliced-together strips of film negatives for activating the marking system in the machine to place separately identifiable sort marks on the strip of print paper at appropriately-spaced locations for later use in sorting different customer orders from one another after photographic development of the print paper.

It is important that the photoprinter marking system operate in reliable fashion to place the aforementioned cut marks and sort marks on the strip of print paper. However, since the undeveloped rolls of print paper must be kept in a dark environment until the print paper has been developed, failure of the marking system in the photoprinter cannot be detected visually. If such failure of the marking system occurs, it results in the need for film reprocessing or the expenditure of manual labor to hand-cut the prints from the print paper and/or to separate the various customer orders (i.e., rolls of film) from one another, which adds significant costs as well as production time delays to the overall photoprocessing operation.

The present invention is intended to eliminate these problems.

SUMMARY OF THE INVENTION

In accordance with the present invention, a punch alarm system is added to an otherwise conventional photoprinting machine to detect an operational failure of the photoprinter cut and sort marking system. The logic of the system is designed to be compatible with any type of print paper marking system where the marks can be sensed and converted to an electrical signal. For purposes of illustration, the punch alarm sensors will be described hereinafter by reference to automatic photoprinting machines of the type that operate to punch a small cut and sort mark hole in the print paper at the boundary between adjacent prints and film orders, but those skilled in the art will appreciate that the principles described hereinafter are equally applicable to the detection of cut and sort marks of other types which are impressed in or on the print paper by other forms of commercially available photoprinting equipment.

In the embodiment of the invention to be described hereinafter, sensors are added to a pre-existing photoprinting machine at a location downstream of the marking system of the machine, and adjacent the edges of the print paper, for monitoring the print paper to verify the presence of the required sort and cut mark holes, e.g., by passing a small beam of infrared light energy, emitted toward the nonphotosensitive side of the print paper, through the hole in the print paper for detection by an associated photodetector. Since the system directly senses the presence of a hole in the print paper, it verifies without any doubt the proper operation of the photoprinter hole punching system, and is operable, therefore, to detect both a punch unit failure and/or failure of the photoprinter to deliver the required command signals to operate the punch unit.

If the photoprinter hole punch marking system fails an unacceptable number of times to make the required cut or sort marks, the system automatically issues a visual and audible alarm to the operator and stops the photoprinter from further automatic operation. Visual indicators to monitor both the cut and sort hole sensing signals during photoprinter operation are provided on the front panel of the equipment for operator use. These visual indicators also tell the operator whether a cut mark or a sort mark failure has occurred, to permit corrective maintenance to be performed quickly.

A number of features have been incorporated in the system to insure maximum dependability of operation and minimum production down-time in the detection and diagnosis of a failure of the photoprinter cut and/or sort mark system. As already described, the cut and sort marks are directly sensed to verify proper operation of the photoprinter marking system. Two redundant cut mark sensor channels are provided for sensing the presence or absence of cut marks, and two redundant sort mark sensor channels are provided for sensing the presence or absence of sort marks, to provide highly dependable operation. The redundancy provides safeguards against a number of possible occurrences. Component failure of a single cut mark or sort mark sensor and its associated channel circuitry will still allow the punch alarm to operate correctly until the sensor or associated circuitry in question can be repaired in normal off-line scheduled maintenance, thereby preventing costly unnecessary production time shutdown of the photoprinter due to a single punch alarm system component failure inside the photoprinter. This type of single sensor and/or associated circuitry failure can be observed on the cut and sort monitor indicators provided as part of the system. Dirt or paper dust on one sensor blocking the light beam will not stop the proper operation of the punch alarm system or erroneously shut down the photoprinter; and this type of problem is also observable on the cut and sort monitor indicators. Moreover, the use of two sensors, carefully spaced, eliminates the possibility of missing actual hole reads due to intermittent cross-wise mechanical jiggling of the photo paper during photoprinter operation; this type of intermittent problem is also observable on the cut and sort hole monitor indicators.

Proper operation of the redundant cut and sort mark sensor channels can be observed visually during photoprinter operation. A visual indicator for each redundant sensor (i.e., for each of the two cut mark sensors and for each of the two sort mark sensors) is provided on the punch alarm system front panel. During normal photoprinter operation, the indicators will turn on each time a cut and sort mark hole is sensed. Failure of any one of the paired indicators to turn on simultaneously and consistently with its respective mate indicates a malfunction requiring maintenance attention at a convenient time. If at least one of the cut hole monitor indicators is turning off and on regularly in synchronism with the photoprinter paper advance signal, such operation provides absolute proof that a cut hole is being punched. If at least one of the sort hole monitor indicators is turning on periodically (corresponding to the length of a roll of film or customer order) in terms of picture frames, it provides absolute proof that the sort hole is being made. The monitors should be observed regularly by the operator of the photoprinter since they provide the operator with a positive, direct indication of the proper operation of the photoprinter marking system.

To allow for an occasional missed hole or false alarm (e.g., caused by a paper chip temporarily stuck in a hole, failure of the photoprinter to sense a film order splice and generate the required sort hole command to the punch, etc.) the punch alarm system of the present invention is adapted to be preset by the user to allow a small predetermined number of random or successive cut and sort hole misses to occur within a predetermined larger total number of cut and sort marks operations (the larger number being termed hereinafter the "window") before the system issues a failure alarm and/or stops operation of the photoprinter. This feature maximizes production throughput by eliminating normal unavoidable random hole punching failures from stopping production. These occasional problems can be handled easily by the operator of the cutting machines. The design nevertheless insures that a catastrophic failure of the photoprinter marking system will stop the photoprinter operation quickly. It also permits, for example, a deteriorating punch in the marking system to be detected prior to catastrophic failure. If such a punch is starting to wear out, it will occasionally fail to punch a clean hole; but the operator can nevertheless reset the punch alarm and continue operation immediately if this problem occurs only occasionally, and the matter can later be corrected by routine corrective maintenance of the worn punch during normal photoprinter off-line periods of time.

A punch alarm system reset button is provided for use by the operator so that, if the system should generate a cut and/or sort mark failure alarm and shut down the photoprinter, activation of the reset button by the operator will normally cause the photoprinter to recommence automatic operation immediately. The reset button can also be used by the operator to verify the validity of the punch alarm system failure indication. More particularly, following reset, if the photoprinter shuts down again after it has gone through the required preset number of operations, this reaffirms a catastrophic failure of the photoprinter marking system (the cut and/or sort monitor indicator should not light up during such a period of operation following reset, in these circumstances). If the photoprinter continues to operate following reset, and the cut and sort mark monitor lamp indicators are lighting regularly, the operator knows he probably has an intermittent failure, such as a deteriorating punch, and can defer further action, e.g., corrective maintenance, to a later, convenient time. If, after pressing the reset button, the photoprinter refuses to operate, this suggests that the failure is possibly in the punch alarm system itself; this can be quickly verified by disconnecting the system from the photoprinter, whereupon automatic operation of the photoprinter should resume immediately.

A lamp test button is also provided for use by the operator, and, when depressed, all front panel indicators should turn on to show that they are in proper operating condition. Power turn-off, or electrical disconnect of the punch alarm system from the photoprinter, will not affect the normal operation of the photoprinter.

The punch alarm system failure logic is implemented so that a failure or malfunction of either the photoprinter to send a command signal to the punch assembly, or a malfunction of the punch assembly itself, is detected. This type of monitoring capability is absolutely necessary to insure that a roll of print paper will not pass through the photoprinter without cut and/or sort mark holes thereon. A failure of the photoprinter to send punch commands will result in a roll of unpunched print paper in a fashion identical to that which results from a punch assembly failure, and such punch command signal failures do occur in practice. The punch alarm system failure logic requires, moreover, only the paper advance signal as an interface to the photoprinter. Both the cut and sort mark failure indication systems have the ability to accept a designated number of failures (i.e., missed holes) out of a larger number of trials prior to issuing a failure signal, and both of these count values can be adjusted to suit the criteria of the user. This feature assures that random missed hole read signals which may occur for reasons such as an occasional bad film splice not being read by the photoprinter, or a paper chip being stuck in a hole, will not issue a false failure alarm and shut down the printer unnecessarily. The redundant cut and sort mark hole sensors, along with the sensing logic referred to above, insures maximum dependability and virtually no requirement for on-line maintenance that would take the photoprinter out of production temporarily.

BRIEF DESCRIPTION OF THE DRAWINGS

The foregoing objects, advantages, construction and operation of the present invention will become more readily apparent from the following description and accompanying drawings wherein:

FIG. 2 is a functional block diagram of the punch alarm system of the present invention;

FIG. 3, consisting of FIGS. 3A–3E inclusive, illustrates the timing of the punch alarm system of the present invention; and FIG. 4 illustrates the front panel of the punch alarm system of the present invention.

DESCRIPTION OF THE PREFERRED EMBODIMENTS

Figure 1:
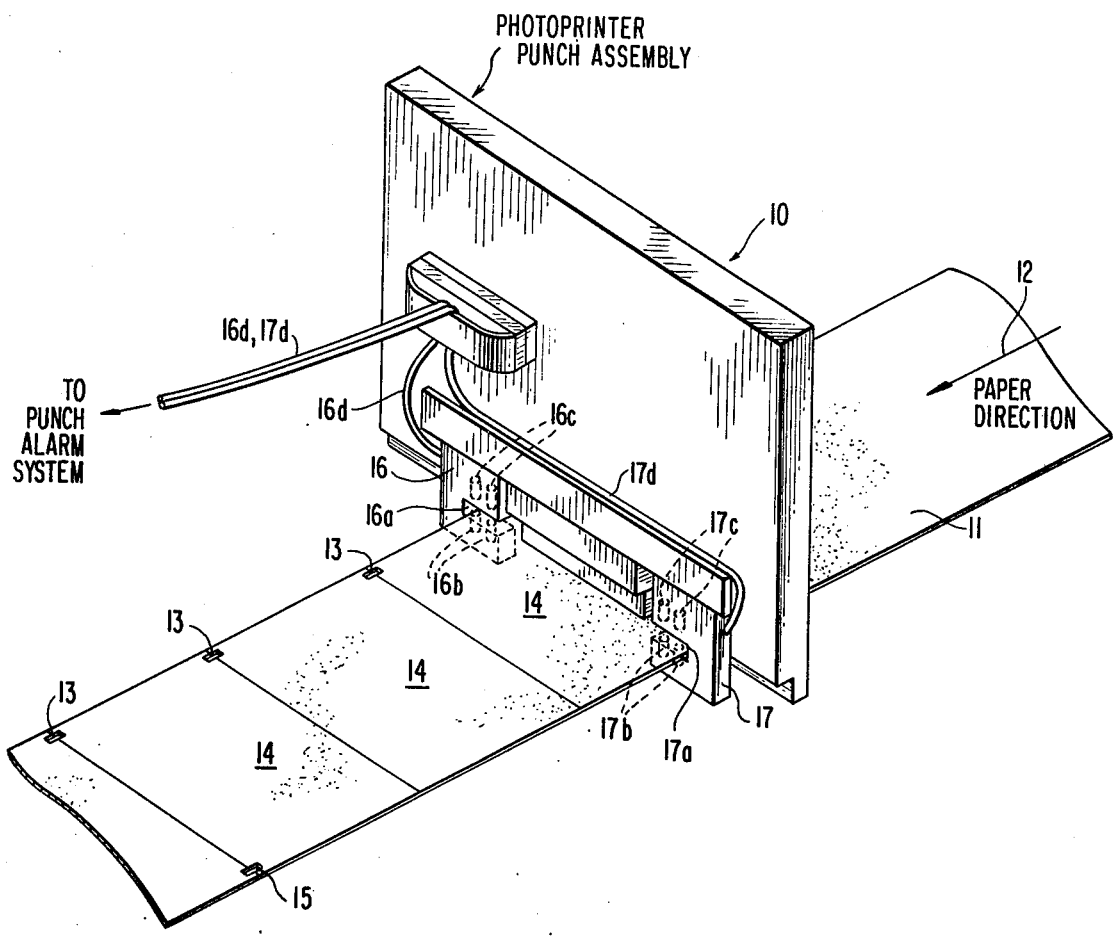
FIG. 1 is a diagrammatic perspective view depicting the punch alarm sort and cut sensors mounted on a photoprinting machine downstream of the marking system or punch assembly therein.

FIG. 1 diagrammatically illustrates a photoprinter 10 which, in known manner, includes means for advancing elongated, spliced-together strips of film negatives through the photoprinting machine and also includes means, responsive to paper advance signals generated within the machine, for advancing an elongated strip 11 of photographic print paper through the machine in the direction of arrow 12. The photoprinter is adapted to expose successive ones of the aforementioned negatives onto successive adjacent portions of the photosensitive side (i.e., the upper side, in FIG. 1) of said strip 11 of print paper. The machine includes a marking system (not shown). For purposes of the present description, the marking system takes the form of a punch assembly (not shown) responsive to signals generated in conjunction with each exposure operation for punching a succession of cut mark holes 13 along one edge of the elongated strip 11 between the adjacent print frames 14 for use, following photographic development of the print paper strip, to cut individual photographic prints from the elongated strip of photographic print paper. Said punch assembly is further responsive in known manner to punch command signals generated by the machine, upon detection of a splice between the aforementioned spliced-together strips of film negatives, for punching a sort mark hole 15 into the elongated strip 11 at a position adjacent the other edge of said strip and at the end of 12, 20, 36, or other number of picture frames exposed from a particular customer's negative film strip for later use in sorting different customer orders from one another after photographic development of the print paper strip.

It is important that the photoprinter reliably make these separately identifiable reference marks 13 and 15 to facilitate the subsequent photoprocessing operations which are to be controlled by such marks. If, therefore, the marks or holes 13, 15 are not being produced with required consistency, e.g., due to a failure of the photoprinting machine to generate appropriate punch command signals and/or due to wear of the punches or other intermittent or complete failure of the punch assembly, it is important that the operator of the photoprinter be apprsed of this development promptly, and in the dark environment where the photoprinter is normally operated, to avoid costly film reprocessing operations, manual print cutting and order sorting operations, and related production time delays.

In accordance with the present invention, this result is achieved by adding cut hole and sort hole sensors to the photoprinter downstream of the punch assembly for monitoring the presence and absence of the holes 13, 15, and by using signals generated by these sensors as inputs to a logic and control circuit which functions to provide the operator of the photoprinter with visual and audible indications relating to the operability of the marking system, and which further functions automatically to shut down operation of the photoprinter if the marking system therein is not operating with adequate reliability.

As shown in FIG. 1, the cut and sort mark hole sensors are mounted adjacent the back side of the punch assembly, and consist of a cut hole sensor block 16 which includes an elongated slot 16a that straddles one edge of the print paper strip emerging from the punch assembly, and a similarly-constructed sort hole sensor block 17 provided with a slot 17a that straddles the other edge of said emerging paper strip 11. Each sensor block contains two redundant light emitting diodes (LEDs) that radiate in the near infrared region where film sensitivity is minimal. The two LEDs in the cut hole sensor block have been designated 16b while the two LEDs in the sort hole sensor block have been designated 17b, and each of these LEDs are located on the bottom of their associated sensor block so that the radiant energy emitted thereby illuminates the back or non-photosensitive side of the print paper strip 11 to effectively shield the light sensitive emulsion side of the print paper. Each sensor block also includes a pair of phototransistors mounted in the top of the block, i.e., phototransistors 16c for block 16, and phototransistors 17c for block 17, and these two phototransistors in each block sense the very short pulse of radiant energy which is received from each LED separately as the hole 13 or 15, as the case may be, in the print paper passes through the sensor block. Each phototransistor generates a pulse which is fed through lines 16d and 17d to the punch alarm system logic and control circuit (to be described hereinafter in reference to FIG. 2).

The spacing of the redundant LEDs and of the corresponding sensing phototransistors in the two sensor blocks are carefully chosen so that two completely independent cut and sort hole sensed signal pulses are generated by each block. If the paper strip 11 should move crosswise slightly, e.g., due to paper mechanical misalignment, one phototransistor sensor will still see a hole and the punch alarm system will still operate properly. The use of two redundant sensors in each block, offset laterally and longitudinally, also eliminates the problem that a single sensor would exhibit if paper dust or a loose paper chip blocked the passage of light in that single sensor. This would cause an erroneous missed hole indication to the punch alarm system electronics. The independent redundant sensing channels also prevent a single component failure in one of the channels from causing a false punch alarm system failure indication.

The two sensor blocks 16, 17 are fabricated of plastic, and are removable as independent modules. The redundant LED's and phototransistors are fixed in position, accurately offset laterally and longitudinally, within the upper and lower portions of each such module. The spacing between the redundant LEDs and phototransistors in each module is related to the expected hole dimensions which are to be sensed. The holes 13, 15 can be rectangular or circular, and the redundant LEDs and phototransistors in each block are offset in a direction transverse to the direction of paper movement by a distance slightly less than the maximum dimension of the hole in that transverse direction. The redundant LEDs and phototransistors in each block are also offset from one another in the direction of paper movement (i.e., in the direction parallel to arrow 12) by a distance sufficient to provide two distinct phototransistor signals with no cross coupling between the signals. The LEDs employed in each block are commercially available, and are selected to have a spectral characteristic as far into the infrared range as can be obtained commercially.

The operation of the punch alarm system will become more readily apparent from consideration of FIGS. 2 and 3. For purposes of simplicity, the four cut and sort hole sensors described with reference to FIG. 1 have been depicted in diagrammatic fashion only at the left side of FIG. 2. The output from each phototransistor is, as will be described, coupled to a voltage comparator and then to a flip-flop storage element; and in practice a separate voltage comparator and flip-flop is provided in each channel, with the outputs of the two flip-flop storage elements associated with the cut hole sensor channels (and the outputs of the two flip-flops associated with the two sort hole sensor channels) being coupled respectively to associated OR circuits (not illustrated) for subsequent control of counters in the cut failure and sort failure portions of the system logic. These duplicate channels and components have also not been illustrated, for purposes of simplicity. The various timing considerations depicted by FIGS. 3A–3E inclusive have been referenced, for purposes of correlating FIGS. 2 and 3 with one another, adjacent appropriate lines in the FIG. 2 functional block diagram of the punch alarm system.

The punch alarm system operation and timing is controlled by the photoprinter paper advance signal (see FIG. 3A) which persists for a specified period of time t equal to, for example, approximately 110 ms. During this time the print paper strip 11 is in motion, and the cut marks 13 and sort marks 15 are detected as they pass through their associated sensor blocks 16, 17. As shown in FIG. 2, a passing hole will allow one or both of the LEDs in the associated sensor block to illuminate one or both of the phototransistors in said block, and when this occurs, the voltage level at the output of said phototransistor drops from a level of approximately +5 volts to approximately 0 volts. The short pulse signals produced by the cut hole sensors $C_1$, $C_2$ are coupled to voltage comparators 20, and the short pulse signals produced by the sort hole sensors $S_1$, $S_2$ are coupled to voltage comparators 21. These voltage comparators (as well as the voltage comparator 24 to be discussed hereinafter) each take the form of an integrated circuit commercially available under the designation LM311, and basically comprise an operational amplifier acting as a thresholding device and functioning to provide an output therefrom (which drops from +5 volts to ground potential) only when the input signal to said voltage comparator exceeds a reference potential $V_T$. The voltage comparators thus help provide noise immunity as well as buffering action to the rest of the circuit and, in effect, filter the signal and provide a threshold voltage adjustment that is fixed in the implementation of the system. The outputs of voltage comparators 20, 21 are illustrated in FIG. 3D, take the form of a clean, well-shaped, singular rectangular cut or sort hole pulse to permit the proper operation of the remainder of the failure logic employed in the system, and prevent the possibility of false noise voltage transients from sending erroneous sort or cut hole signals to the remainder of the system logic.

The paper advance signal from the photoprinter (FIG. 3A) is normally a positive going signal, and is coupled through an inverter 22 to provide a negative going signal required by the subsequent logic. The output of inverter 22 is supplied to a noise filter and delay circuit 23 which eliminates short noise voltage spikes that may exist on the paper advance line and prevent such spikes from generating false strobe (FIG. 3B) and reset (FIG. 3C) signals. Circuit 23 acts as a pulse width discriminator, and requires that the paper advance signal (FIG. 3A) remain low for a sufficient period of time before an output strobe signal (FIG. 3B) is generated. Circuit 23 also produces a delay $\Delta t$ of approximately 25 ms (see FIG. 3D) between the end of the paper advance signal and the beginning of the strobe signal. This delay insures that any electrical transients caused by a stopping of the photoprinting machine have settled down before the sensitive failure detection logic circuitry is examined by the strobe pulse to verify the required presence of the cut holes (or sort holes as the case may be). The output of circuit 23 is coupled through a voltage comparator 24 having the construction and operation described previously with respect to elements 20 and 21, and provides at its output 25 the aforementioned strobe signal (FIG. 3B).

Considering now the operation of the cut hole failure logic of the system, the output from voltage comparator 24, comprising the aforementioned strobe signal generated by occurrence of a paper advance signal, is coupled from line 25 to one input of AND gate 26. Both inputs to gate 26 must be high for that gate to produce an output. The second input to said gate is derived from the output (FIG. 3E) of a flip-flop storage element 27, the input of which (FIG. 3D) is supplied by the output of voltage comparators 20. If a cut hole 13 was detected by the elements in sensor block 16, the output of the cut channel flip-flop 27 will be low, and gate 26 will be closed. If, however, no cut hole was detected as the paper strip passed through sensor block 16, the output of the flip-flop will be high. In these latter circumstances, when the strobe signal (FIG. 3B) supplied to gate 26 goes high, an output high pulse will be coupled from gate 26 through line 26a to the input of a cut failure counter 28.

It will be appreciated from the foregoing that the logic, being jointly responsive to the paper advance signal and to the output of the hole sensor, proceeds on the assumption that a cut hole should be detected every time a paper advance signal occurs, and the cut failure counter 28 therefore counts the absences of cut holes. It continues to count each cut fail pulse until it reaches a predetermined value which is adjustably set into the counter 28 by the user of the equipment, and when said preset count is achieved, counter 28 produces an output signal which illuminates a cut failure indicator 29 comprising an LED visible to the operator of the equipment on the front panel of said equipment (see FIG. 4) and is coupled through an OR circuit 30 to activate an audible failure alarm 31 (see also FIG. 4) and to supply a signal on line 32 to automatically shut down operation of the photoprinting equipment.

The successive strobe signals appearing on line 25 are also coupled to the input of a printer operation counter 33. Counter 33 counts each strobe signal thereby, in effect, to count the number of photoprinter paper advance signals. Counter 33 is also adapted to be adjustably preset by the user to count to a specific value before it generates an output pulse, and when the counter 33 reaches the preselected value which has been set into the counter, it generates an output pulse on line 34 to reset the cut failure counter 28 to zero. In this manner, random false alarms, caused by a paper chip or some other random problem, are prevented from issuing unnecessary false alarms and slowing production. Typically, the printer operation counter 33 is set to a value such as 1000, corresponding to the approximate number of print frames in a single elongated roll of print paper 11, and cut failure counter 28 is typically set to count to a value such as 3 or 4. This means, therefore, that three or four random missed hole signals must occur in 1000 operations before a punch alarm system failure indication is given.

The sort hole failure logic is somewhat analogous. Signals from the output of the sort hole sensors $S_1$, $S_2$ are supplied to voltage comparators 21 the outputs of which are in turn coupled to flip-flop storage elements 35 which operate and produce outputs in a manner analogous to that previously described with respect to elements 20 and 27. The strobe signals on line 25 are supplied to a second printer operation counter 36 to manage the sort hole failure indication logic. Counter 36 is preset to count a number of printer operations up to the maximum number of prints expected on the longest roll film being processed by the photoprinter, e.g., typically, counter 36 is set to count to a maximum of 40 printer operations corresponding to a 36-exposure roll of 135 millimeter film. If counter 36 reaches the count of 40 before receiving a sort hole signal from the output of flip-flop storage 35, it is assumed that a sort hole miss has occurred and the counter 36 sends a single pulse to a sort failure counter 37. If however, a sort hole signal is produced at the output of voltage comparators 21, the output of flip-flop storage 35 automatically resets counter 36 to zero, so that counter 36 then begins to look for a new sort hole which must occur within the next 40 printer operations.

If the photoprinter is, for example, only processing film that has a maximum of 20 exposures, printer operation counter 36 would be set by the operator to count to 21 or 22 before indicating a sort hole miss to the sort failure counter 37. Counter 37, in turn, is typically preset to count two failures before it issues a sort failure punch alarm signal. The sort failure counter 37 is reset manually by the operator, e.g., by depression of a reset button 38 on the front panel of the equipment (see FIG. 4), which reset button also provides a reset pulse to all of the other elements in the system including cut failure counter 28, or, in the alternative, counter 37 is reset to zero automatically by a sort window counter 39 which receives its input from the output of flip-flop storage 35. Sort window counter 39 counts the number of sort hole channel detection signals from the sort channel voltage comparator 21 up to a maximum desired count which has been preset into counter 39 by the user (typically counter 39 would be set to a value such as 32). When sort window counter 39 reaches its preset value, it provides an output signal which operates to reset sort failure counter 37 to begin counting from zero. This unique implementation of the sort hole failure detection logic is completely independent of the photoprinter sort command signal, and this insures that missed sort holes will be detected and counted regardless of whether the photoprinter has failed to generate a command signal or whether the punch itself has malfunctioned.

It is not possible to predict exactly when a sort hole will occur due to the varying lengths (or number of print frames) in successive different orders being processed. In effect, therefore, the sort failure logic senses that a new sort hole must occur within a preset number of paper advance signals after the last detected sort hole. When the sort failure counter 37 counts a specified number, e.g. two, sort hole absences, it generates an output signal to energize the sort failure indicator 40 (see also FIG. 4), and supplies a signal through OR gate 30 to energize audible alarm 31 and to shut down the photoprinter operation.

The start of each photoprinter paper advance machine cycle is used to generate a short system reset pulse (FIG. 3C) for purposes of resetting the cut/sort hole storage flip-flops shown in FIG. 2 so that they are ready to accept the new cut and sort mark hole sensing signals on the next paper advance photoprinter machine cycle. More particularly, the signal appearing on line 25 at the output of voltage comparator 24 is coupled to one input of an AND gate 41, the other input to which is connected to a source of fixed positive voltage. Gate 41 is provided simply to assure that the signal which appears on line 42 exhibits a proper polarity for triggering reset pulse generator 43.

It will be appreciated that the punch alarm system failure logic is such that a failure or malfunction of the photoprinter to send a command signal to the punch assembly, or in the alternative a malfunction of the punch assembly itself, is detected. This is an important feature of the invention since a failure of the photoprinter to send punch command signals will result in a roll of unpunched print paper in the same manner which would occur in the event of a punch assembly failure. The punch alarm system failure logic requires, moreover, only the paper advance signal as an interface to the photoprinter. Both the cut and sort mark failure indication systems have the ability to accept m failures (missed holes) out of n trials prior to issuing a failure signal, wherein both m and n can be adjusted to suit the criteria of the user. This feature is important to assure that random missed hole read signals, occurring for such reasons as the photoprinter failing to detect an occasional bad film splice and/or the occurrence of a paper chip stuck in a hole, will not issue a false failure alarm and shut down the printer unnecessarily. In addition, the redundant cut and sort mark hole sensors, along with the sensing logic discussed above, insures maximum dependability and virtually no requirement for on-line maintenance that would take the photoprinter out of production temporarily.

The front panel of the equipment, which is viewed by the operator during operation of the equipment, is shown in FIG. 4. It includes a power switch 41 for turning on the punch alarm system (the photoprinter will operate, however, with the power switch in either its on or off position), and further includes a small LED indicator 42 which is energized when the power is on. A lamp test switch 43 is provided, and depression of said switch energizes all of the LEDs in the system to assure that they are operating correctly. Depression of reset switch 38, mentioned previously, resets to zero all counters and flip-flop storage units in the system, so that the punch alarm system restarts its cycle of operation with the photoprinter. Depression of switch 38 after a system sort or cut fail removes the signal from line 32 (FIG. 2) to permit the photoprinter to start its automatic operation again until the punch alarm system failure logic delivers a further failure signal to the photoprinter.

Failure of the photoprinter punching system is indicated by the sort and cut fail LED indicator lights 29, 40 as well as by the audible alarm 31, referred to previously. The individual cut and sort fail indicators aid maintenance personnel in fault isolation, and prevent costly printer production time from being wasted.

The front panel of the equipment further includes four individual hole sensor indicators 44, 45 (associated with the two redundant cut hole sensors respectively) and 46, 47 (associated with the two redundant sort hole sensors respectively) which are energized by the outputs of the voltage comparators 20, 21 (see FIG. 2) to provide a visual indication that the sort and cut punching system is working properly during photoprinter operation. Both cut monitor indicators 44, 45 should light in synchronism and almost simultaneously with each paper advance cycle of the photoprinter. Both sort indicator monitors 46, 47 should light periodically, e.g., at least once in about 40 photoprinter paper advance cycles, assuming that a 36-exposure roll film is being processed. If both indicators of the redundant cut or sort mark pair do not always light simultaneously, it indicates that a problem exists in one redundant channel. If either indicator light operates, this represents absolute proof that a hole is being punched. If both indicators of the pair are not lighting, this indicates almost absolutely that holes are not being punched and the punch alarm system failure logic should, after counting the required preset number of paper advance signals, sound an alarm and automatically shut the printer down.

With a proper understanding of the monitor lights 44-47, and by appropriate use of the punch alarm reset button 38, it is possible to quickly verify if a system punch failure indication is valid, or whether the failure represents a punch alarm system malfunction. More particularly, if, after occurrence of a punch alarm system failure indication, the operator pushes reset button 38 and the photoprinter refuses to resume operation for at least one paper advance cycle, it is almost certain that the punch alarm itself is malfunctioning. Disconnecting the punch alarm interface connector (diagrammatically represented at 48 in FIG. 2) to the paper advance signal line should allow resumption of normal automatic photoprinter operation; if not, the malfunction is in the photoprinter. If the operator pushes the reset button 38, and the photoprinter begins advancing paper, and at least one of the monitor lights 44, 45 of the cut hole sensor pair and at least one of the monitor lights 46, 47 of the sort hole sensor pair are working, this indicates that the photoprinter hole punches are positively working. In such an event, the operator can logically suspect that the prior system failure indication may have been caused, for example, by paper dust, dirt, or a punch unit that is beginning to degrade so as to fail occasionally to cut adequate holes. In such circumstances, the operator can arrange to schedule corrective maintenance at an early opportunity. Similarly, if observation of the monitor lights 44-47 shows that only one indicator of a cut or sort pair is lighting regularly, maintenance should also be scheduled.

If depression of the reset button 38 causes the machine paper advance to begin operating, and none of the cut or sort mark monitor indicators 44-47 light, the operator can be practically certain that the previous failure indication was valid. The punch alarm system should issue a new failure signal after the required number of printer paper advance operations, determined by the failure logic, has occurred. If the system does not shut down in such circumstances, this would in turn indicate that there has been a malfunction in the punch alarm system itself.

The entire system can be implemented with any type of solid state logic integrated circuitry (TTL, CMOS, etc.), or by the use of a microprocessor or microcomputer. The system can be readily installed on existing photoprinters without requiring any alteration in the photoprinter equipment, simply by connecting the line carrying the photoprinter paper advance signals to the input of the punch alarm circuit, and by mounting the sensor blocks at an appropriate location downstream of the photoprinter punch equipment or marking system. Operation of the punch alarm system is otherwise completely independent of the photoprinter operation, and will not affect the photoprinter operation regardless of whether the alarm system is on or off, or connected or disconnected.

While we have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. In a photoprinting machine for use in a photoprocessing operation, said photoprinting machine including means for advancing elongated, spliced-together strips of film negatives through said machine and also including means for advancing an elongated strip of photographic print paper through said machine in a step-by-step operation in response to successive paper advance signals generated by said machine for exposing successive ones of said negatives onto the photosensitive side of successive portions of said print paper, and said photoprinting machine further including marking means therein responsive to each of said paper advance signals for placing an indentifiable cut mark on said strip of print paper between each of said successive portions of print paper for later use in cutting individual photographic prints from said elongated strip of photographic print paper after photographic development of said print paper, said photoprinting machine also including means responsive to the detection of a splice in said spliced-together strips of film negative for activating said marking means to place a separately identifiable sort mark on said strip of print paper for later use in sorting different customer orders from one another after photographic development of said print paper, the improvement comprising first sensor means in said photoprinting machine located adjacent the path of advance of said elongated strip of photographic print paper downstream of said marking means for monitoring the presence and absence of said identifiable cut marks, second sensor means in said photoprinting machine located adjacent the path of advance of said elongated strip of photographic print paper downstream of said marking means for monitoring the presence and absence of said separately identifiable sort marks, and control means coupled to each of said first and second sensor means and responsive to the successive paper advance signals generated by said machine for providing the operator of said photoprinting machine with an indication of the operability of said marking means in said machine, said control means including counter means for counting absences of said cut marks, and means responsive to said counter means having counted to a predetermined value for indicating that there has been a failure of said marking means.

2. The improvement of claim 1 wherein each of said first and second sensor means includes means for emitting radiant energy toward said elongated strip of photographic print paper.

3. The improvement of claim 2 wherein said means for emitting radiant energy are located to emit said energy toward the side of said photographic print paper opposite to said photosensitive side thereof.

4. The improvement of claim 1 wherein said marking means comprises a punch assembly in said machine operative to produce said cut marks in the form of cut holes in said strip of print paper spaced from one another along one elongated edge of said strip of print paper and operative to produce said sort marks in the form of sort holes in said strip of print paper spaced from one another along the other elongated edge of said strip of print paper, said first sensor means being located adjacent said one edge of said strip of print paper and comprising radiant energy emitter means adjacent one side of said strip and radiant energy detector means located adjacent the other side of said strip, and said second sensor means being located adjacent said other edge of said strip of print paper and comprising radiant energy emitter means adjacent one side of said strip and radiant energy detector means adjacent the other side of said strip.

5. The improvement of claim 4 wherein said radiant energy emitter means includes means operative to emit radiation only in the near infrared region.

6. The improvement of claim 4 wherein said radiant energy emitter means comprises first and second light emitting diodes in said first and second sensor means respectively, said radiant energy detector means comprising first and second phototransistors in said first and second sensor means respectively.

7. The improvement of claim 6 wherein each of said phototransistors are located adjacent the photosensitive side of said elongated strip of print paper, each of said light emitting diodes being located adjacent the oppositive, nonphotosensitive side of said strip of print paper.

8. The improvement of claim 4 wherein the radiant energy emitter means in said first sensor means comprises a pair of light emitting diodes spaced from one another adjacent said one edge of said strip, the radiant energy emitter means in said second sensor means comprising a further pair of light emitting diodes spaced from one another adjacent said other edge of said strip.

9. The improvement of claim 8 wherein the diodes in each of said pairs are spaced from one another in a direction transverse to the direction of advance of said strip of print paper by a distance which is related to the dimensions of the holes which are to be produced by said punch assembly.

10. The improvement of claim 9 wherein the radiant energy detector means in each of said sensor means comprises a pair of phototransistors which are spaced from one another in accordance with the spacing between the pair of light emitting diodes in said sensor means.

11. The improvement of claim 10 wherein the pair of diodes in each of said sensor means are spaced from one another in the direction of advance of said strip of print paper by a distance sufficient to provide two distinct, time-separated, non-cross-coupled output signals from the pair of phototransistors in said sensor means.

12. The improvement of claim 1 wherein said control means includes visual indicator means.

13. The improvement of claim 1 wherein said control means includes audible alarm means.

14. The improvement of claim 1 wherein said control means includes means for selectively disabling the operation of said photoprinting machine.

15. The improvement of claim 1 including means for adjustably setting said predetermined value.

16. The improvement of claim 1 wherein said counter means includes a first counter responsive to said paper advance signals for counting printing operations of said photoprinting machine, a second counter jointly responsive to said paper advance signals and to signals from said first sensor means for counting absences of cut marks, and means coupling the output of said first counter to said second counter to reset said second counter to a zero value if a preselected number of cut mark absences have not occurred within a designated number of printer operations.

17. The improvement of claim 1 wherein said control means includes further counter means for counting absences of said sort marks, and means responsive to said further counter means having counted to a designated value for indicating that there has been a failure of said marking means.

18. The improvement of claim 17 including means for adjustably setting said designated value.

19. The improvement of claim 17 wherein said further counter means includes a first counter responsive to said paper advance signals for counting printing operations of said photoprinting machine, said first counter being operative to produce an output signal only after it has reached a predetermined count, means responsive to detection of a sort mark for resetting said first counter to a zero value, a second counter coupled to the output of said first counter for counting the number of output signals produced by said first counter, said second counter being operative to produce an output signal only after it has reached a specified count, and means responsive to an output signal from said second counter for indicating that there has been a failure of said marking means.

20. The improvement of claim 19 including a third counter for counting the number of sort marks which are detected by said second sensor means, said third counter being operative to produce an output signal after it has reached a designated count, and means responsive to an output signal from said third counter for resetting said second counter to a zero value.

* * * * *